United States Patent [19]
Lutz

[11] 3,944,395
[45] Mar. 16, 1976

[54] ELEMENT FOR HEATING SYSTEM

[76] Inventor: George H. Lutz, 1210 Front St., Binghamton, N.Y. 13905

[22] Filed: Mar. 4, 1974

[21] Appl. No.: 447,729

Related U.S. Application Data

[62] Division of Ser. No. 358,314, May 8, 1973, Pat. No. 3,813,036.

[52] U.S. Cl.................................. 29/183.5; 29/183
[51] Int. Cl.² ............................................. B22F 5/00
[58] Field of Search ... 29/180 R, 180 S, 183, 183.5; 55/526; 15/209 A, 209 AH; 126/247; 122/26; 138/41, 42; 210/499

[56] References Cited
UNITED STATES PATENTS

| | | | |
|---|---|---|---|
| 2,334,263 | 11/1943 | Hartwell | 55/526 X |
| 2,439,424 | 4/1948 | Goodloe et al. | 15/209 A X |
| 2,462,316 | 2/1949 | Goodloe | 15/209 A X |
| 2,764,147 | 9/1956 | Brunner | 122/26 X |
| 3,327,866 | 6/1967 | Pall et al. | 210/499 |
| 3,564,843 | 2/1971 | Hirschler, Jr. et al. | 55/526 X |
| 3,724,502 | 4/1973 | Hayner et al. | 138/41 |
| 3,776,701 | 12/1973 | Hunter | 55/526 X |

OTHER PUBLICATIONS

Webster's Third New International Dictionary–G & C, Merriam Co. Springfield, Mass–1963, pp. 2638, 2591, 1179.

Primary Examiner—C. Lovell
Assistant Examiner—O. F. Crutchfield
Attorney, Agent, or Firm—Samuelson & Jacob

[57] ABSTRACT

A heating system utilizing a closed oil system and a friction element for heating the oil as the oil is forced through the element. The oil's path is from a storage tank through the friction element, then to the radiation units and then is returned to the storage tank. A high temperature path and a low temperature path are provided to improve comfort control.

The heating element is formed of woven stainless steel which is compressed in a mold to obtain sufficient strand density to produce a high heat of friction.

1 Claim, 3 Drawing Figures

ELEMENT FOR HEATING SYSTEM

This application is a division of application Ser. No. 358,314, filed May 8, 1973, now U.S. Pat. No. 3,813,036.

The invention relates to friction elements for closed heating systems utilizing a liquid such as oil as the heat transfer medium. In particular, the invention relates to an improved friction heating element used therein and to a method of making the element.

Most residential heating systems possess some or all of the following inherent disadvantages:
1. Inefficient heat transfer.
2. Discharge of pollutants into the atmosphere.
3. Wide temperature differential in the heated area during mild days.

Broadly, the present invention comprises a friction heating element for a closed heating system using a liquid such as oil as the heat transfer medium. The oil is pumped through the system which comprises the friction heating element and one or more radiation units which transfer the heat from the oil to the ambient atmosphere. The friction heating element is formed of woven metal wire such as stainless steel which is compressed into a cylindrical block. This provides a tortuous path for the liquid as it is pumped through the block and due to the frequent frictional contacts between the wires in the block and the liquid, the liquid is heated. The heated liquid gives off some of the heat so acquired to the ambient environment through the radiation means.

An important object of the invention is to provide a friction heating element such that the heating system in which it is used is economical to operate, efficient and environmentally clean.

It is yet another object of the invention to provide a method of making such friction heating elements.

These and other objects, advantages, features and uses will be apparent during the course of the following description, when taken in conjunction with the accompanying drawing, wherein.

Figure 1:
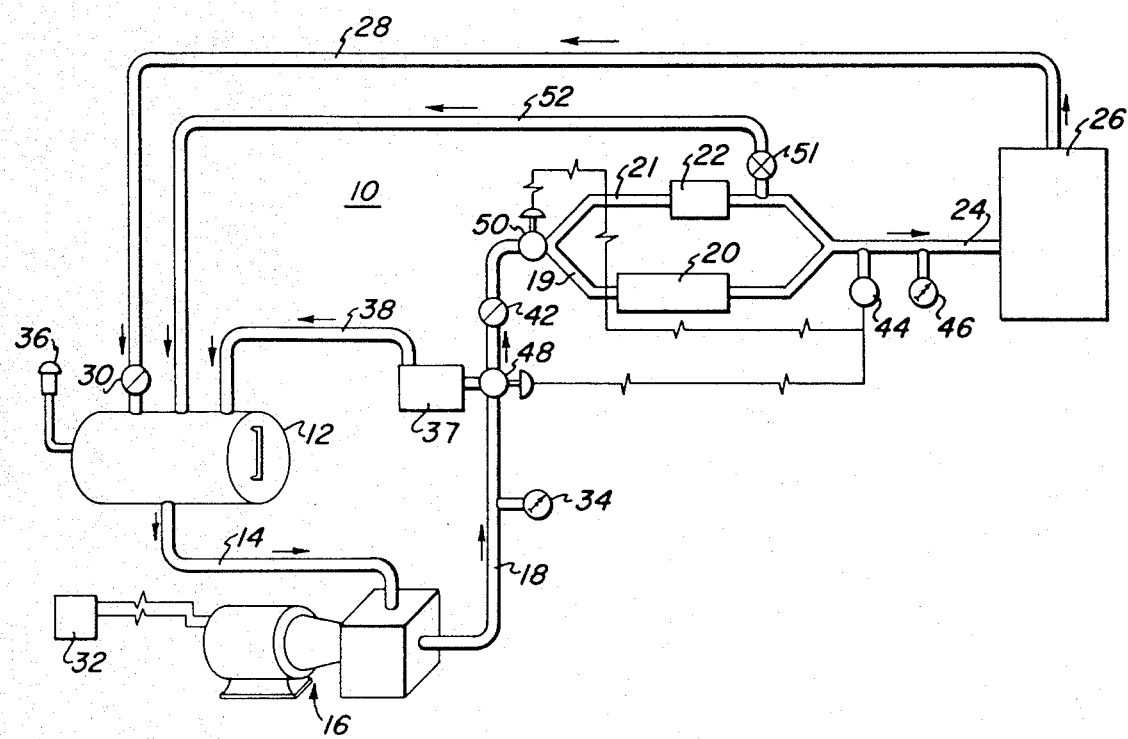
FIG. 1 is a block diagram of a heating system utilizing a friction element of the invention.

In the drawings, wherein, for the purpose of illustration, there are shown preferred embodiments of the invention and wherein like numerals designate like parts throughout the same, the numeral 10 designates a heating system of the invention generally.

System 10 is a closed system and is seen to comprise a storage tank 12 having an outlet line 14, a motor and pump 16 for pumping liquid from tank 12 into a distribution line 18. The liquid from the distribution line 18 is heated in friction heating element 20 or friction heating element 22 and the heating liquid is fed through line 24 to one or more radiation units 26 which take heat from the heated liquid to heat the ambient atmosphere.

The liquid then returns through a line 28 to storage tank 12. To prevent bleed feed from line 28 into tank 12 a low pressure check valve 30 is provided near the tank. This keeps line 28 full at all times. Control of the system is accomplished by means of a switch 32 which may be thermostatically controlled. A breather 36 is affixed to tank 12 for the usual purposes. A pressure gage 34 is used to monitor the pressure of the pumped liquid and may be provided with suitable mechanisms, well known in the art, to operate a safety switch 37 to return liquid directly to tank 12 through line 38.

In normal operation, the liquid is pumped through line 18, past check valve 42 and into line 19. Then it proceeds through friction heating element 20. The liquid follows a tortuous path through element 20 and is heated therein. Its temperature is sensed by thermostat 44 and its pressure by gage 46. Gage 46 may be used to actuate control equipment (not shown) to shut down the system if the pressure is outside normal limits or it may be used for monitoring only. The operating pressure of the system should preferably be between 800 and 2000 psi.

Thermostat 44 may be used in several ways:
1. If there is no branch 21 and heating element 22 in the system, it may actuate solenoid 48 to bypass element 20 when the temperature is above a first predetermined value (too high). Then, the liquid will return to tank 12 through line 38. When the temperature is below a second predetermined value (too low), the flow is directed through element 20.

2. If there is a branch 21 and an element 22 which is similar to element 20 but smaller, a solenoid valve 50 is actuated to divert the liquid from element 20 and direct it toward element 22. Since element 22 is smaller than element 20, the contact between the liquid and the wires is shorter and there is less friction and less heat generated. Valve 51 may be operated manually or automatically to direct the liquid from element 22 back to tank 12 through line 52 or through line 24 to the radiation units 26.

3. Thermostat 44 may direct some of the liquid through bypass line 38 and safety switch 37 by means of solenoid valve 48 and some of it through element 22 by means of solenoid valve 50.

The liquid used in the system is synthetic oil such as resistant bean oil, cottonseed oil or similar products. This liquid retains heat better than water so that the system is more efficient. For example, 2 pounds of water at 200°F dropped 40°F in 15 minutes while 2 pounds of the liquid at 200°F dropped 27°F in 15 minutes in the same ambient environment.

By way of illustration and without limiting the scope of the invention, I have found that using 10 pounds of No. 40 synthetic fluid at 2000 psi., the system generates 45,600 btu per hour and at 1600 psi, it generates 42,600 btu per hour. In both cases the delivery rate was 1.28 gallons per minute and the electrical power consumed was about 1500 watts.

Figure 2:
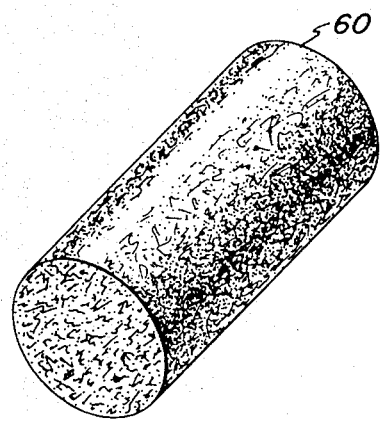
FIG. 2 is a perspective view of a friction heating element of the invention.
Figure 3:
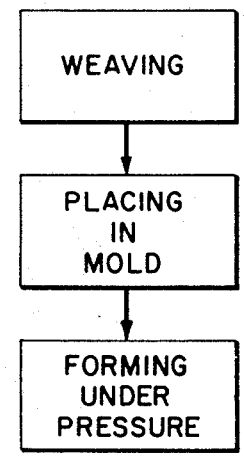
FIG. 3 is a block diagram of the steps of the method of making friction heating elements of the invention.

In FIG. 2 there is illustrated a friction heating element 60 which is the same in construction as elements 20 and 22. It is formed of woven metal wire such as stainless steel having a diameter of the order of 0.005 inch. About 1900 yards of the wire is woven into a mass having volume of about 5 cubic inches. The mass is then placed in a mold and compressed under a pressure of the order of 25,000 psi (FIG. 3). The final compressed volume is about one-half the woven volume.

Element 22 is formed by the method set forth above to the preferable final dimensions of 1.2 inches in length and a base diameter of 0.75 inch. The density is preferably of the order of 0.28 pounds per cubic inch. Element 20 is preferably an assembly of two elements 22 in series so that the liquid is in contact with the element over twice the length in element 20 than it is in element 22. The use of standard size elements in systems of the invention simplifies manufacture and reduces costs.

While particular embodiments of the invention have been shown and described, it is apparent to those skilled in the art that modifications are possible without departing from the spirit of the invention or the scope of the subjoined claims.

The embodiments of the invention in which an exclusive property or privilege is claimed are defined as follows:

1. A friction heating element for a closed heating system utilizing a liquid such as oil as the heat transfer medium, said friction heating element comprising:
a compressed block formed of metal wire woven so as to form a tortuous path for the liquid to traverse therethrough said woven metal wire being stainless steel having a diameter of the order of 0.005 inches, and the density of said compressed block being of the order of 0.28 pounds per cubic inch.

* * * * *